United States Patent
Okamoto et al.

(10) Patent No.: US 7,820,763 B2
(45) Date of Patent: Oct. 26, 2010

(54) RUBBER COMPOSITION AND GOLF BALL INCLUDING THE SAME AS RUBBER BASE MATERIAL

(75) Inventors: Naomi Okamoto, Ichihara (JP); Kouji Ishiguchi, Ichihara (JP)

(73) Assignee: Ube Industries, Ltd. (JP)

( * ) Notice: Subject to any disclaimer, the term of this patent is extended or adjusted under 35 U.S.C. 154(b) by 431 days.

(21) Appl. No.: 10/565,430

(22) PCT Filed: Jan. 6, 2006

(86) PCT No.: PCT/JP2006/300073

§ 371 (c)(1),
(2), (4) Date: Mar. 6, 2008

(87) PCT Pub. No.: WO2006/075555

PCT Pub. Date: Jul. 20, 2006

(65) Prior Publication Data

US 2009/0215552 A1 Aug. 27, 2009

(30) Foreign Application Priority Data

Jan. 14, 2005 (JP) .............................. 2005-007557

(51) Int. Cl.
C08L 23/00 (2006.01)
C08L 9/00 (2006.01)
(52) U.S. Cl. ....................... 525/240; 525/237
(58) Field of Classification Search .................. 525/240
See application file for complete search history.

(56) References Cited

U.S. PATENT DOCUMENTS

2003/0125450 A1* 7/2003 Fujisawa et al. ............ 524/502

FOREIGN PATENT DOCUMENTS

| CN | 1468871 A | | 1/2004 |
|---|---|---|---|
| JP | 61-073707 | | 4/1986 |
| JP | 62-089750 | | 4/1987 |
| JP | 63-275356 | | 11/1988 |
| JP | 02-177973 | | 7/1990 |
| JP | 2000-256507 A | | 9/2000 |
| JP | 2001-302730 A | | 10/2001 |
| JP | 2002-265680 | | 9/2002 |
| JP | 2004-043714 | | 2/2004 |
| JP | 2005-008817 | | 1/2005 |
| JP | 2005008817 A | * | 1/2005 |
| JP | 2006-16518 | | 1/2006 |

OTHER PUBLICATIONS

Translation of JP2005008817, Jan. 2005.*
International Preliminary Report on Patentability relating to PCT/JP2006/300073; Dated Jan. 24, 2008; Four (4) pages.
Int. Search Report and Written Opinion.
Supplementary European Search Report which issued in connection with corresponding European Application No. 06711461.1 on Oct. 26, 2009.

* cited by examiner

Primary Examiner—Ling-Siu Choi
Assistant Examiner—Hui Chin
(74) Attorney, Agent, or Firm—Clark Hill PLC

(57) ABSTRACT

A rubber composition comprises a rubber component. The rubber component contains (A) 1-70 weight parts of polybutadiene rubber having a Mooney viscosity (ML) of 35-50 and composed of (a) 1-9 weight % of a boiled n-hexane insoluble fraction having a melting point of 180° C. or higher and (b) 99-91 weight % of a boiled n-hexane soluble fraction. The rubber component also contains (B) 99-30 weight parts of diene-based rubber other than (A). A crosslinking coagent (C) is mixed in the rubber component.

5 Claims, 1 Drawing Sheet

RUBBER COMPOSITION AND GOLF BALL INCLUDING THE SAME AS RUBBER BASE MATERIAL

BACKGROUND OF THE INVENTION

1. Field of the Invention

The present invention relates to a rubber composition for use in golf balls; tires including tire outer parts such as treads and sidewalls, and tire inner parts such as carcasses, belts, and beads; industrial products such as rubber vibration isolators, belts, hoses, and rubber vibration suspensions; and shoes such as men's shoes, women's shoes, and sports shoes. More particularly, it relates to a golf ball rubber composition for use in golf balls, and a golf ball.

2. Description of the Related Art

Polybutadiene for use in golf balls as rubber base material is required to have high hardness, high rebound and impact resistance as well as excellent processability. Patent Document 1 (JP-A2004-43714) discloses a technology that provides improvements in high hardness, high rebound, and impact resistance. In general, however, a higher Mooney viscosity improves the rebound but worsens the processability. In contrast, a wider molecular weight distribution improves the processability but worsens the rebound. In a word, there is an antinomy between the improvements in processability and rebound. For the purpose of achieving the compatibility of processability and rebound, improvements in the property of polybutadiene have been tried and various proposes have been provided. For example, Patent Document 2 (JP-A 63-275356) and Patent Document 3 (JP-A2-177973) disclose polybutadienes having a high Mooney viscosity and a wide molecular weight distribution and synthesized in the presence of a Ni-based catalyst.

Further methods are disclosed to employ two types of rubber with different rubber physical properties. For example, Patent Document 4 (JP-B 6-80123) discloses polybutadiene rubber with a low Mooney viscosity and polybutadiene rubber with a high Mooney viscosity.

SUMMARY OF THE INVENTION

There are still needs for those having much higher rebound and more excellent processability than the prior art. Therefore, there is an object to provide a rubber composition suitable for golf balls having high hardness and high rebound and excellent in extrusion processability, and a golf ball using the rubber composition as rubber base material.

To achieve the above object the present invention relates to a rubber composition, which comprises a rubber component containing (A) 1-70 weight parts of polybutadiene rubber having a Mooney viscosity (ML) of 35-50 and composed of (a) 1-9 weight % of a boiled n-hexane insoluble fraction having a melting point of 180° C. or higher and (b) 99-91 weight % of a boiled n-hexane soluble fraction, and (B) 99-30 weight parts of diene-based rubber other than (A); and a crosslinking coagent (C) mixed therein. The present invention also relates to a golf ball including the rubber composition as rubber base material.

In the rubber composition according to the present invention, preferably, the boiled n-hexane insoluble fraction (a) comprises syndiotactic polybutadiene, having a reduction viscosity of 1.0-3.0, and the boiled n-hexane soluble fraction (b) has a molecular weight distribution (Weight average molecular weight (Mw)/Number average molecular weight (Mn)) of 3.0-5.0. Preferably, the boiled n-hexane soluble fraction (b) has a Mooney viscosity of 25-40 and a cis content of 95% or higher.

Also in the rubber composition according to the present invention, preferably, the diene-based rubber (B) has a molecular weight distribution (Weight average molecular weight (Mw)/Number average molecular weight (Mn)) of 2.5-5.0.

Thus, the present invention is possible to provide a rubber composition suitable for golf balls having high hardness and high rebound and excellent in extrusion processability, and a golf ball using the rubber composition as rubber base material.

DETAILED DESCRIPTION OF THE INVENTION

Figure 1:
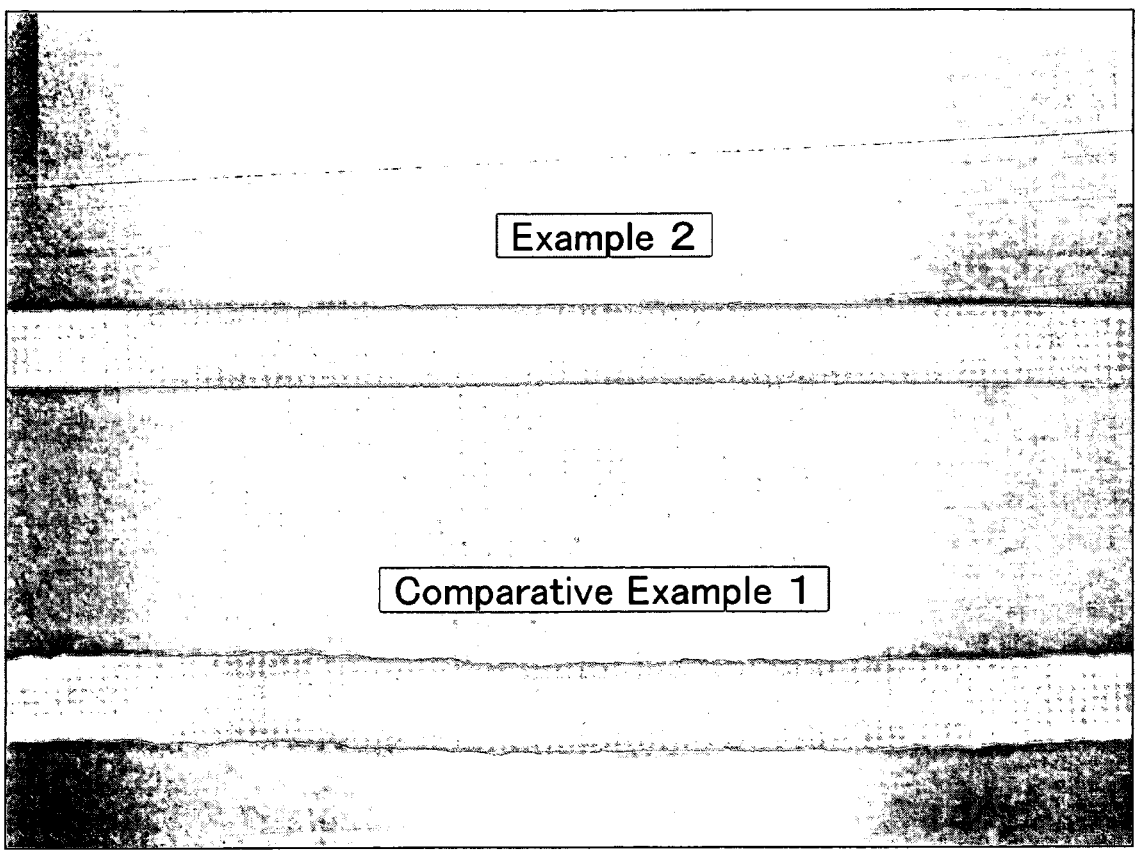
FIG. 1 shows photographs of a rubber composition according to Example 2 and a rubber composition according to Comparative Example 1.

In the rubber composition according to the present invention, the (A) composition of the polybutadiene composition is substantially composed of the boiled n-hexane insoluble fraction (a) and the boiled n-hexane soluble fraction (b), and the composition (A) has a Mooney viscosity (ML) of 35-50.

In this case, the boiled n-hexane insoluble fraction is referred to as a portion that is collected as an insoluble fraction when polybutadiene rubber is refluxed in the boiled n-hexane. On the other hand, the boiled n-hexane soluble fraction is referred to as a portion that is dissolved in n-hexane when polybutadiene rubber is refluxed in the boiled n-hexane.

The boiled n-hexane insoluble fraction has a proportion of 1-9 weight %, and preferably 2-7 weight %. A proportion of the boiled n-hexane insoluble fraction less than the above range causes a problem because it worsens the processability. On the other hand, a proportion of the boiled n-hexane insoluble fraction more than the above range is not preferable because it may increase the mixture viscosity and worsen the processability.

The boiled n-hexane insoluble fraction mainly comprises syndiotactic-1,2-polybutadiene itself, and/or polybutadiene having a syndiotactic-1,2 structure as a major structure. It has a melting point of 180° C. or higher, preferably 190° C. or higher. Preferably, it has a reduction viscosity of 1.0-3.0.

The boiled n-hexane soluble fraction mainly comprises high cis-1,4-polybutadiene itself, and/or polybutadiene having a high cis-1,4 structure as a major structure.

Preferably, the boiled n-hexane soluble fraction has a Mooney viscosity ($ML_{1+4}$) of 25-40 at 100° C. A Mooney viscosity below 25 is not preferable because it lowers the rebound. On the other hand, a Mooney viscosity above 40 causes a problem because it increases the mixture viscosity and worsens the processability.

Preferably, the boiled n-hexane soluble fraction has a 5% toluene solution viscosity (T-cp) of 70-250 at 25° C.

The 5% toluene solution viscosity (T-cp) of the boiled n-hexane soluble fraction at 25° C. and the Mooney viscosity ($ML_{1+4}$) have a ratio (T-cp/ML) of 2-5, preferably 2-3. A ratio below 2 is not preferable because it lowers the rebound. On the other hand, a ratio above 5 causes a problem because it increases the cold flow property of raw rubber.

Preferably, the boiled n-hexane soluble fraction has a weight average molecular weight (Mw) of 450-600 thousands. Preferably, the boiled n-hexane soluble fraction has a number average molecular weight (Mn) of 100-300 thousands. Preferably, the weight average molecular weight (Mw) and the number average molecular weight (Mn) have a ratio (Mw/Mn) of 3.0-5.0. A ratio below 3 is not preferable because it may worsen the processability. A ratio above 5 causes a problem because it lowers the rebound.

Preferably, the boiled n-hexane soluble fraction has a cis content of 95% or higher, more preferably 97% or higher. A content below 95% is not preferable because it worsens the rebound.

The polybutadiene (A) component can be produced through a two-stage polymerization method. The two-stage polymerization method is a method of polymerizing 1,3-butadiene through two separate stages. In the first stage, cis-1,4 polymerization is implemented to obtain high cis-1,4-polybutadiene (boiled n-hexane soluble fraction). Then, without halting the polymerization, a catalyst for syndiotactic-1,2 polymerization is subsequently added to synthesize syndiotactic-1,2-polybutadiene (boiled n-hexane insoluble fraction), resulting in polybutadiene rubber including the boiled n-hexane insoluble fraction dispersed in the boiled n-hexane soluble fraction. In contrast, the syndiotactic-1,2 polymerization may be implemented in the first stage, and the cis-1,4 polymerization in the second stage.

As the cis-1,4 polymerization catalyst and the syndiotactic-1,2 polymerization catalyst, those publicly known can be employed, respectively.

Examples of the cis-1,4 polymerization catalyst include Ziegler-Natta catalysts such as diethyl aluminum chloride-cobalt-based catalysts, trialkyl aluminum-boron trifluoride-nickel-based catalysts, diethyl aluminum chloride-nickel-based catalysts, and triethyl aluminum tetraiodotitanium-based catalysts; and lanthanoid element-based catalysts such as triethyl aluminum-organic acid neodymium-Lewis acid-based catalysts.

Examples of the syndiotactic-1,2 polymerization catalyst include soluble cobalt-organoaluminum compound-carbon disulfide-based catalysts, and soluble cobalt-organoaluminum compound-carbon disulfide-based catalysts-nitrile compound-based catalysts. Polymerization conditions such as polymerization degrees and polymerization catalysts can be set appropriately in accordance with publicly known methods.

The polybutadiene (A) component may also be produced through other blending methods. A blending method comprises previously polymerizing syndiotactic-1,2-polybutadiene and high cis-1,4-polybutadiene separately and then blending them. A solution blending method comprises blending them in solution states. A melt blending method comprises melting and kneading them using a Banbury mixer or an extrusion kneader. Alternatively, high cis-1,4-polybutadiene or syndiotactic-1,2-polybutadiene may be blended in the polybutadiene rubber synthesized through the two-stage polymerization method.

In the rubber composition according to the present invention, preferably, the diene-basedrubber (B) has a molecular weight distribution (Weight average molecular weight (Mw)/Number average molecular weight (Mn)) of 2.5-5.0. Available examples of the diene-based rubber include polybutadiene and others such as natural rubber, isoprene rubber and styrene butadiene rubber.

The component (A) and the component (B) have proportions of (A) 1-70 weight parts and (B) 99-30 weight parts. A proportion below 1 of the component (A) is not preferable because it worsens the extrusion processability. A proportion above 70 of the component (A) is not preferable because it lowers the rebound.

In the rubber composition according to the present invention, the crosslinking coagent mixed in the rubber composition is preferably one of monovalent or divalent metallic salts of α,β-ethylenic unsaturated carboxylic acid. Specific examples thereof include zinc diacrylate, basic zinc methacrylate, and zinc dimethacrylate. These metallic salts of α,β-ethylenic unsaturated carboxylic acid may be directly mixed with the rubber composition in general methods. In another method, a metal oxide such as zinc oxide is previously kneaded in the rubber composition. In addition, an α,β-ethylenic unsaturated carboxylic acid such as acrylic acid and methacrylic acid is added and kneaded in the rubber composition to achieve the reaction of the α,β-ethylenic unsaturated carboxylic acid with the metal oxide in the rubber composition. As a result, a metallic salt of α,β-ethylenic unsaturated carboxylic acid is obtained.

The mixed amount of the crosslinking coagent preferably falls within 10-50 weight parts on the basis of 100 weight parts of the rubber base material. If the mixed amount of the crosslinking coagent is smaller than the above range, crosslinking can not proceed sufficiently, resulting in lowered rebound performance, shortened carries, and worsened durability. If the mixed amount of the crosslinking coagent is larger than the above range, the compression becomes too large and accordingly the feeling of impact worsens.

It is preferable in the present invention that, in addition to the crosslinking coagent, peroxides are mixed as essential components in the rubber composition that will configure a rubbery portion.

The peroxides act as initiators for crosslinking, grafting and polymerizing the rubber and the crosslinking coagent. Suitable specific examples of the peroxides include dicumil peroxide, 1,1-bis(t-butylperoxy)3,3,5-trimethylcyclohexan.

The mixed amount of the peroxides falls within 0.2-5 weight parts on the basis of 100 weight parts of the rubber base material. If the mixed amount of the peroxides is smaller than the above range, crosslinking and so forth can not proceed sufficiently, resulting in lowered rebound performance, shortened carries, and worsened durability. If the mixed amount of the peroxides is larger than the above range, over-cure (over crosslinking) occurs, resulting in increased frag-ileness and worsened durability.

The rubber composition may be mixed with zinc oxide also acting as a crosslinking auxiliary when the crosslinking coagent is zinc diacrylate or zinc methacrylate. Further, a filling agent such as barium sulfate, an anti-oxidant, and an additive such as zinc stearate may be mixed, if required.

EXAMPLES

Examples of the rubber composition according to the present invention will be described below specifically.

A melting point was determined from a peak temperature on a heat absorption curve measured at a temperature elevation rate of 10° C./min using a differential scanning calorimeter (DSC).

A reduction viscosity was measured by dissolving 0.2 g of the boiled n-hexane insoluble fraction in 100 ml of o-dichlorobenzene using a Uberode viscometer at a temperature of 135° C.

A microstructure was identified in the infrared absorption spectrum analysis. The microstructure was calculated from the absorbed intensity ratio at cis 740 $cm^{-1}$, trans 967 $cm^{-1}$, and vinyl 910 $cm^{-1}$.

A molecular weight (Mw, Mn) was measured in a GPC method: HLC-8220 (available from Toso Inc.) and calculated by standard polystyrene conversion.

Mooney viscosity ($ML_{1+4}$, 100° C.) of a raw rubber and mixture was measured based on JIS 6300.

A mixture Mooney viscosity was evaluated with an index relative to 100 of Comparative Example 1. The smaller the index, the lower the viscosity becomes and the better the processability.

Extrusion processability was evaluated by extruding using a MPT (processability tester available from Monsanto Inc.) under the condition with a die (D=1.5 mm, L/D=1) at a temperature of 80° C., and 50/sec.

A die swell was calculated from a sectional ratio between the die and the extrusion and estimated by an index relative to 100 of Comparative example 1. The smaller the index, the better the dimension stability becomes.

A surface condition was checked by visually observing the extrusion and determined on the basis of Excellent (O), Melt fracture (Δ), and Heavy melt fracture (x).

Hardness was measured in accordance with a measuring method stipulated under JIS-K6253 using a durometer (type D) and estimated by an index relative to 100 of Comparative example 1. The larger the index, the higher the hardness becomes.

A 10% modulus/tensile strength was measured in accordance with a measuring method stipulated under JIS-K6251 using a No. 3 dumbbell at a tensile rate of 500 mm/min and estimated by an index relative to 100 of Comparative example 1. The larger the index, the higher and better the 10% modulus/tensile strength becomes.

A rebound was measured in accordance with a measuring method stipulated under JIS-K6251 in a tripso test and estimated by an index relative to 100 of Comparative example 1. The larger the index, the higher and better the rebound becomes.

Examples 1-6, Comparative Examples 1-4

Polybutadienes shown in Table 1 were employed to produce rubber compositions according to Examples 1-6 and Comparative examples 1-4. The respective measured results are shown in Table 2. In addition, photographs taken from a rubber composition according to Example 2 and a rubber composition according to Comparative Example 1 are shown in FIG. 1.

TABLE 1

| Trade Name | | BR230 (*1) | BR700 (*2) | VCR800 (*3) | VCR450 (*4) | SPB150 (*5) |
|---|---|---|---|---|---|---|
| Mooney Viscosity (ML) | | 38 | 38 | 40 | 39 | — |
| (*6) | (*8) | — | — | 5.3 | 3.8 | 100 |
|  | (*9) | — | — | 201 | 201 | 150 |
|  | (*10) | — | — | 2.1 | 2.1 | 1.2 |
| (*7) | ML | 38 | 38 | 34 | 35 | — |
|  | Mw (10⁴) | 63 | 51 | 50 | 51 | — |
|  | Mn (10⁴) | 14 | 18 | 13 | 13 | — |
|  | Mw/Mn | 4.5 | 2.8 | 3.8 | 3.9 | — |
|  | Cis (%) | 98 | 98 | 98 | 98 | — |

(*1) BR230: High cis polybutadiene rubber from Ube
(*2) BR700: High cis polybutadiene rubber from Ube
(*3) VCR 800: Reinforced polybutadiene rubber from Ube
(*4) VCR 450: Reinforced polybutadiene rubber from Ube
(*5) SBP150: Labo-polymerized SPB of JP-A 2004-43714
(*6) Boiled n-hexane insoluble fraction
(*7) Boiled n-hexane soluble fraction
(*8) Proportion (wt. %)
(*9) Melting Point (° C.)
(*10) Reduction Viscosity

TABLE 2

| | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| BR230 | 97 | 90 | 70 | 50 | — | 70 | 100 | — | 20 | 90 |
| BR700 | — | — | — | — | 90 | — | — | — | — | — |
| VCR800 | 3 | 10 | 30 | 50 | 10 | — | — | 100 | 80 | — |
| VCR450 | — | — | — | — | — | 30 | — | — | — | — |
| SPB150 | — | — | — | — | — | — | — | — | — | 10 |
| (*11) | 100 | 100 | 101 | 102 | 101 | 100 | 100 | 103 | 103 | 112 |
| (*12) | 98 | 97 | 95 | 93 | 97 | 96 | 100 | 89 | 92 | 98 |
|  | Δ | O | O | O | O | O | X | O | O | Δ |
| (*13) | 100 | 102 | 105 | 107 | 112 | 105 | 100 | 109 | 107 | 119 |
| (*14) | 101 | 104 | 108 | 112 | 121 | 106 | 100 | 127 | 121 | 145 |
| (*15) | 100 | 103 | 105 | 102 | 100 | 101 | 100 | 107 | 105 | 101 |
| (*16) | 100 | 100 | 99 | 98 | 100 | 99 | 100 | 94 | 95 | 94 |

(*11) Mixture ML
(*12) Extrusion Swell Surface condition
(*13) Hardness
(*14) 10% Modulus
(*15) Tensile strength
(*16) Rebound Other Mixed Agents:

| Zinc acrylate | 30 Actor ZA, Kawaguchi Chemical |
|---|---|
| ZnO | 20 Zinc oxide |
| DCP | 1 Dicumil peroxide |
| | 155° C. × 15 min press vulcanization |

As obvious from the above, the rubber compositions according to Examples 1-6 have high hardness and high rebound and are excellent in extrusion processability. To the contrary, the rubber composition according to Comparative Example 1 is extremely poor in surface condition of the extrusion as shown in FIG. 1 and the rubber compositions according to Comparative Examples 2-4 have lower rebound, respectively.

What is claimed is:

1. A rubber composition, comprising:
a rubber component containing
   (A) 1-70 weight parts of polybutadiene rubber having a Mooney viscosity (ML) of 35-50 and composed of (a) 1-9 weight % of a boiled n-hexane insoluble fraction having a melting point of 180° C. or higher and (b) 99-91 weight % of a boiled n-hexane soluble fraction having a molecular weight distribution (Weight average molecular weight (Mw)/Number average molecular weight (Mn)) of 3.0-5.0, and
   (B) 99-30 weight parts of diene-based rubber other than (A); and a crosslinking coagent (C) mixed therein.

2. The rubber composition according to claim 1, wherein the boiled n-hexane insoluble fraction (a) comprises syndiotactic polybutadiene, having a reduction viscosity of 1.0-3.0.

3. The rubber composition according to claim 1, wherein the boiled n-hexane soluble fraction (b) has a Mooney viscosity of 25-40 and a cis content of 95% or higher.

4. The rubber composition according to claim 1, wherein the diene-based rubber (B) has a molecular weight distribution (Weight average molecular weight (Mw)/Number average molecular weight (Mn)) of 2.5-5.0.

5. A golf ball including the rubber composition according to claim 1 as a rubber base material.

* * * * *